United States Patent
Naito et al.

(10) Patent No.: US 12,007,288 B2
(45) Date of Patent: Jun. 11, 2024

(54) DETECTION METHOD, DETECTION APPARATUS AND DETECTION SYSTEM

(71) Applicant: PRIME PLANET ENERGY & SOLUTIONS, INC., Tokyo (JP)

(72) Inventors: Masakazu Naito, Himeji (JP); Eiji Kawasaki, Kasai (JP); Kosuke Yamamoto, Himeji (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 206 days.

(21) Appl. No.: 17/506,774

(22) Filed: Oct. 21, 2021

(65) Prior Publication Data

US 2022/0170801 A1  Jun. 2, 2022

(30) Foreign Application Priority Data

Nov. 30, 2020 (JP) .................................. 2020-198011

(51) Int. Cl.
*G01K 15/00* (2006.01)
*G01K 7/22* (2006.01)

(52) U.S. Cl.
CPC ............. *G01K 15/007* (2013.01); *G01K 7/22* (2013.01)

(58) Field of Classification Search
CPC ........ G01K 15/007; G01K 7/22; G01K 15/00; F01D 41/222
See application file for complete search history.

(56) References Cited

U.S. PATENT DOCUMENTS

| 4,522,512 A | * | 6/1985 | Atkins | ................... G01N 25/18 219/505 |
| 6,161,958 A | * | 12/2000 | Rattman | .............. G08B 29/043 327/512 |
| 2010/0256866 A1 | * | 10/2010 | Toda | ..................... F02P 19/027 701/29.2 |
| 2012/0120981 A1 | * | 5/2012 | Genssle | .............. F02D 41/1466 73/1.06 |
| 2014/0369376 A1 | * | 12/2014 | Keeton | ................ G01K 15/007 374/1 |

FOREIGN PATENT DOCUMENTS

| CN | 109506811 A | 3/2019 | |
| EP | 2 985 580 A1 | 2/2016 | |
| EP | 2985580 A1 | * 2/2016 | ........... G01K 15/007 |
| JP | S 63-100341 A | 5/1988 | |
| JP | H 02-141784 A | 5/1990 | |
| JP | 2000-171309 A | 6/2000 | |

(Continued)

*Primary Examiner* — Logan M Kraft
*Assistant Examiner* — Joshua Campbell
(74) *Attorney, Agent, or Firm* — Finnegan, Henderson, Farabow, Garrett & Dunner, LLP.

(57) ABSTRACT

There is provided a detection method for detecting a failure of a thermistor, the detection method comprising: applying a load to the thermistor over time; measuring a physical property value of the thermistor at least at a first time and a second time during a time period in which the load is being applied to the thermistor; and detecting the failure of the thermistor based on first data indicating the physical property value of the thermistor measured at the first time and second data indicating the physical property value of the thermistor measured at the second time.

20 Claims, 13 Drawing Sheets

(56) References Cited

FOREIGN PATENT DOCUMENTS

| JP | 2009-156966 A | | 7/2009 |
|----|---------------|---|--------|
| JP | 2010-255618 A | | 11/2010 |
| JP | 2018-137054 A | | 8/2018 |
| JP | 2018137054 A | * | 8/2018 |
| JP | 2020-008480 A | | 1/2020 |

* cited by examiner

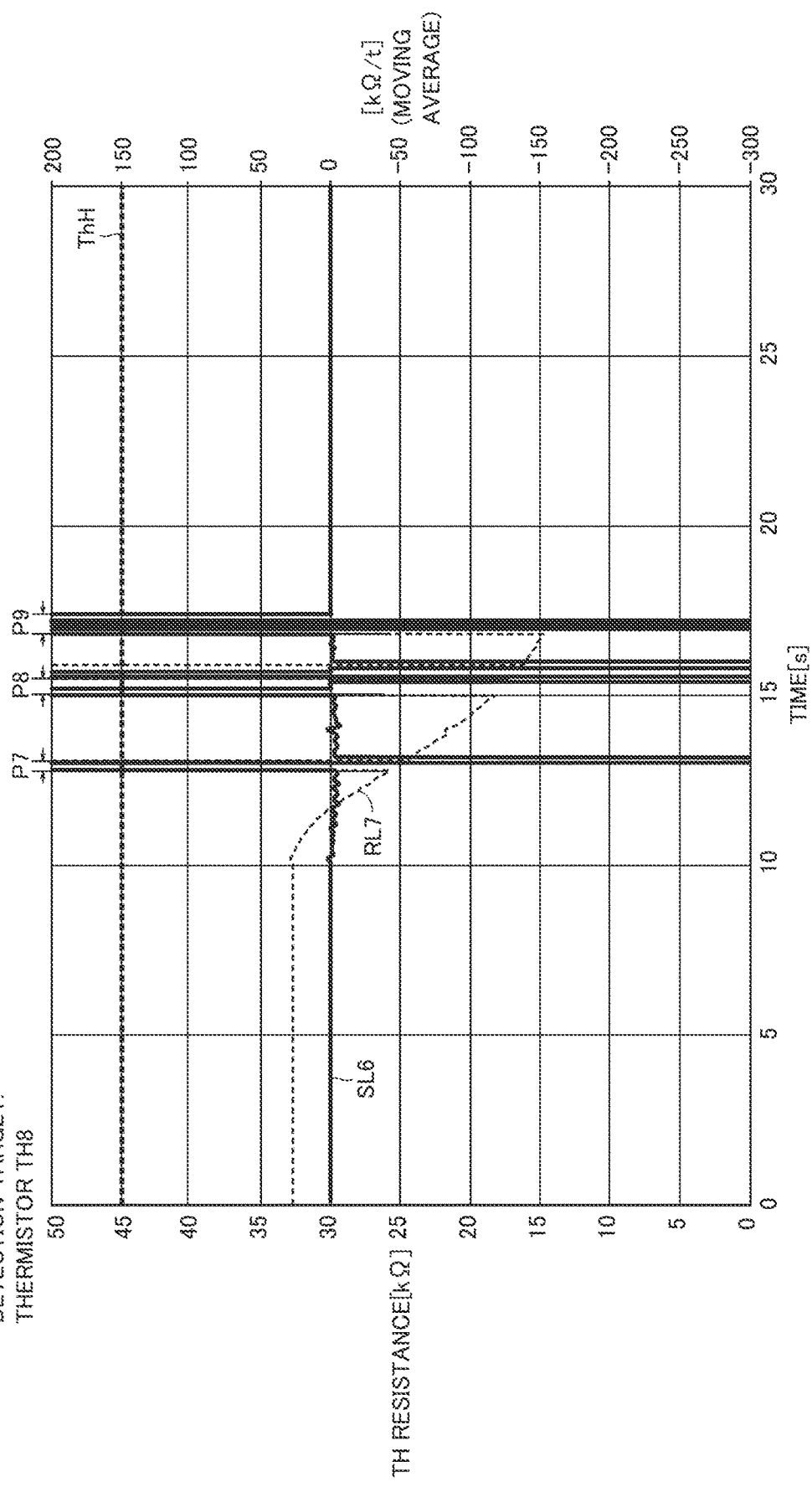

DETECTION METHOD, DETECTION APPARATUS AND DETECTION SYSTEM

This nonprovisional application is based on Japanese Patent Application No. 2020-198011 filed on Nov. 30, 2020 with the Japan Patent Office, the entire contents of which are hereby incorporated by reference.

BACKGROUND OF THE INVENTION

Field of the Invention

The present disclosure relates to the technique for detecting a failure of a thermistor.

Description of the Background Art

Various techniques for detecting a failure of a thermistor have been conventionally proposed. For example, Japanese Patent Laying-Open No. 2000-171309 describes the technique for housing a first thermistor and a second thermistor having different temperature output characteristics in a single package, measuring voltage values of both of the thermistors, and determining the possibility of a failure of the thermistors by using the measured voltages and a prescribed temperature map.

In the technique described in Japanese Patent Laying-Open No. 2000-171309, it is determined whether or not a temperature value TA corresponding to a voltage value VA of the first thermistor is almost equal to a temperature value TB corresponding to a voltage value VB of the second thermistor, and when negative determination is made, an abnormality process is performed.

SUMMARY OF THE INVENTION

As in the technique described in Japanese Patent Laying-Open No. 2000-171309, failure/no-failure determination has been conventionally made using an electric resistance value of a thermistor in a certain test environment. That is, if the electric resistance value of the thermistor is normal when a current is applied, the thermistor is determined as non-faulty. Therefore, when failure/no-failure determination is made of a thermistor that basically operates normally but shows an abnormal electric resistance value momentarily, the thermistor cannot in some cases be detected as faulty in the conventional test.

An object of the present disclosure is to provide a detection method that makes it easier to detect, as faulty, a thermistor showing an abnormal electric resistance value momentarily.

A detection method for detecting a failure of a thermistor according to the present disclosure includes: applying a load to the thermistor over time; measuring a physical property value of the thermistor at least at a first time and a second time during a time period in which the load is being applied to the thermistor; and detecting the failure of the thermistor based on first data indicating the physical property value of the thermistor measured at the first time and second data indicating the physical property value of the thermistor measured at the second time.

A detection apparatus that detects a failure of a thermistor includes: a load unit that applies a load to the thermistor over time; a measurement unit that measures a physical property value of the thermistor at least at a first time and a second time during a time period in which the load is being applied to the thermistor; and a detection unit that detects the failure of the thermistor based on first data indicating the physical property value of the thermistor measured at the first time and second data indicating the physical property value of the thermistor measured at the second time.

A detection system that detects a failure of a thermistor includes: a load unit that applies a load to the thermistor over time; a measurement unit that measures a physical property value of the thermistor at least at a first time and a second time during a time period in which the load is being applied to the thermistor; and a detection unit that detects the failure of the thermistor based on first data indicating the physical property value of the thermistor measured at the first time and second data indicating the physical property value of the thermistor measured at the second time.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 13 shows transition of an electric resistance value and a moving average value of a thermistor.

DESCRIPTION OF THE PREFERRED EMBODIMENTS

Figure 1:
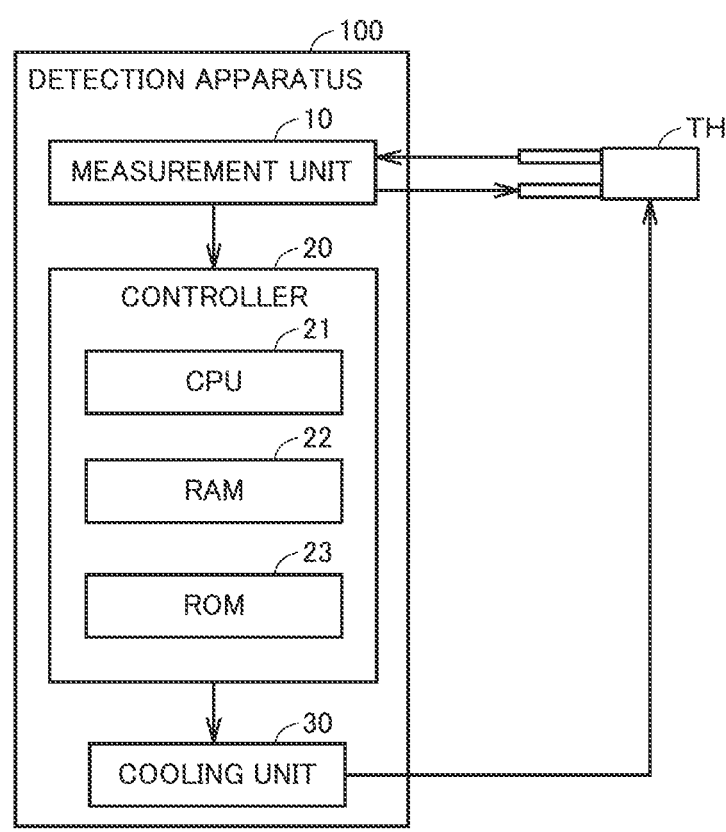
FIG. 1 schematically shows an example configuration of a detection apparatus according to a first embodiment.

Embodiments of the present disclosure will be described in detail hereinafter with reference to the drawings, in which the same or corresponding portions are denoted by the same reference characters and description thereof will not be repeated.

First Embodiment

FIG. 1 schematically shows an example configuration of a detection apparatus 100 according to a first embodiment.

Detection apparatus 100 is an apparatus that detects a failure of a thermistor TH that is a detection target. Examples of the failure of thermistor TH include a contact failure in an internal circuit of thermistor TH, and the like. FIG. 1 shows a state in which thermistor TH is connected to detection apparatus 100.

Thermistor TH is a negative temperature coefficient (NTC) thermistor using a phenomenon in which an electric resistance value of thermistor TH increases as a temperature of thermistor TH decreases. When the temperature is within the range of −35° C. to 65° C., the electric resistance value of thermistor TH changes. When the temperature of thermistor TH is −35° C., the electric resistance value of thermistor TH is 800 kΩ. When the temperature of thermistor TH is 65° C., the electric resistance value of thermistor TH is 6.85 kΩ. In an aspect, thermistor TH may be a positive temperature coefficient (PTC) thermistor.

Detection apparatus 100 includes a measurement unit 10, a controller 20 and a cooling unit 30. Detection apparatus 100 may not be formed as an integrated apparatus. Specifically, measurement unit 10, controller 20 and cooling unit 30 may be provided separately and connected to one another through a wired or wireless network, to thereby form a detection system.

Measurement unit 10 measures the electric resistance value of thermistor TH. Measurement unit 10 is electrically connected to thermistor TH. Measurement unit 10 indirectly measures the electric resistance value by applying a certain voltage to thermistor TH and measuring a current value. That is, measurement unit 10 measures a value of a current flowing through thermistor TH.

Controller 20 includes a central processing unit (CPU) 21, a random access memory (RAM) 22 and a read only memory (ROM) 23. CPU 21 performs a program for controlling the operation of detection apparatus 100.

RAM 22 stores an application program performed by CPU 21, and referenced data. In an aspect, RAM 22 is implemented by a static random access memory (SRAM), a dynamic random access memory (DRAM), or the like.

ROM 23 stores a program such as an operating system (OS) performed by CPU 21. In an aspect, ROM 23 is implemented by an erasable programmable ROM (EPROM), an electrically erasable programmable ROM (EEPROM), a flash memory, or the like.

In another aspect, controller 20 may be implemented by a circuit element such as at least one embedded CPU, at least one application specific integrated circuit (ASIC) or at least one field programmable gate array (FPGA). Furthermore, in another aspect, controller 20 may be implemented by a combination of two or more circuit elements.

Cooling unit 30 cools thermistor TH connected to measurement unit 10. Cooling unit 30 may, for example, cool thermistor TH by using a chemical reaction, or may be an evaporator or the like of a refrigeration cycle apparatus. Hereinafter, the process of cooling thermistor TH by cooling unit 30 will be simply referred to as "cooling process".

<Transition of Electric Resistance Value of Thermistor TH>

Figure 2:
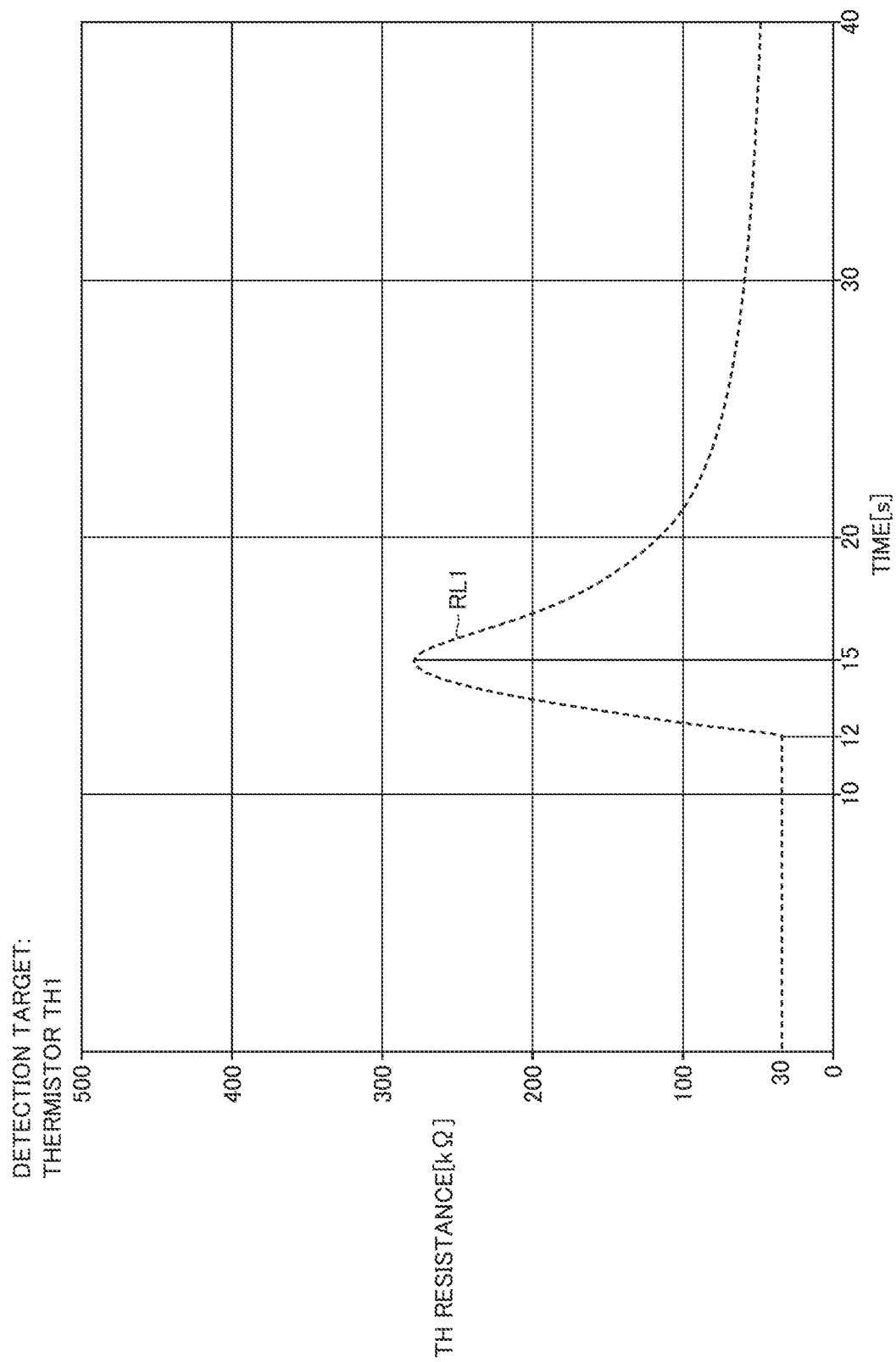
FIG. 2 shows transition of an electric resistance value of a thermistor.
Figure 3:
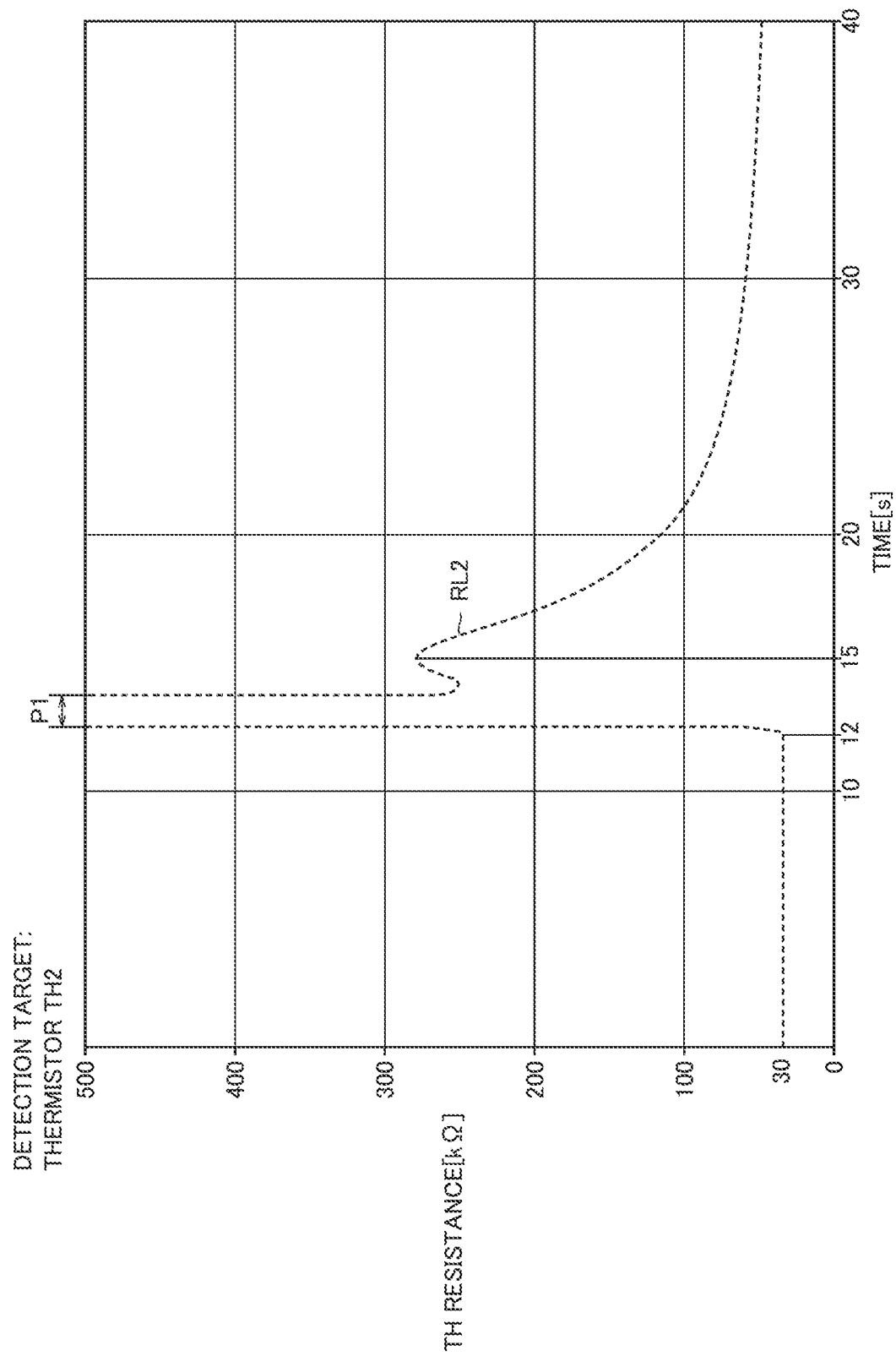
FIG. 3 shows transition of an electric resistance value of a thermistor.
Figure 4:
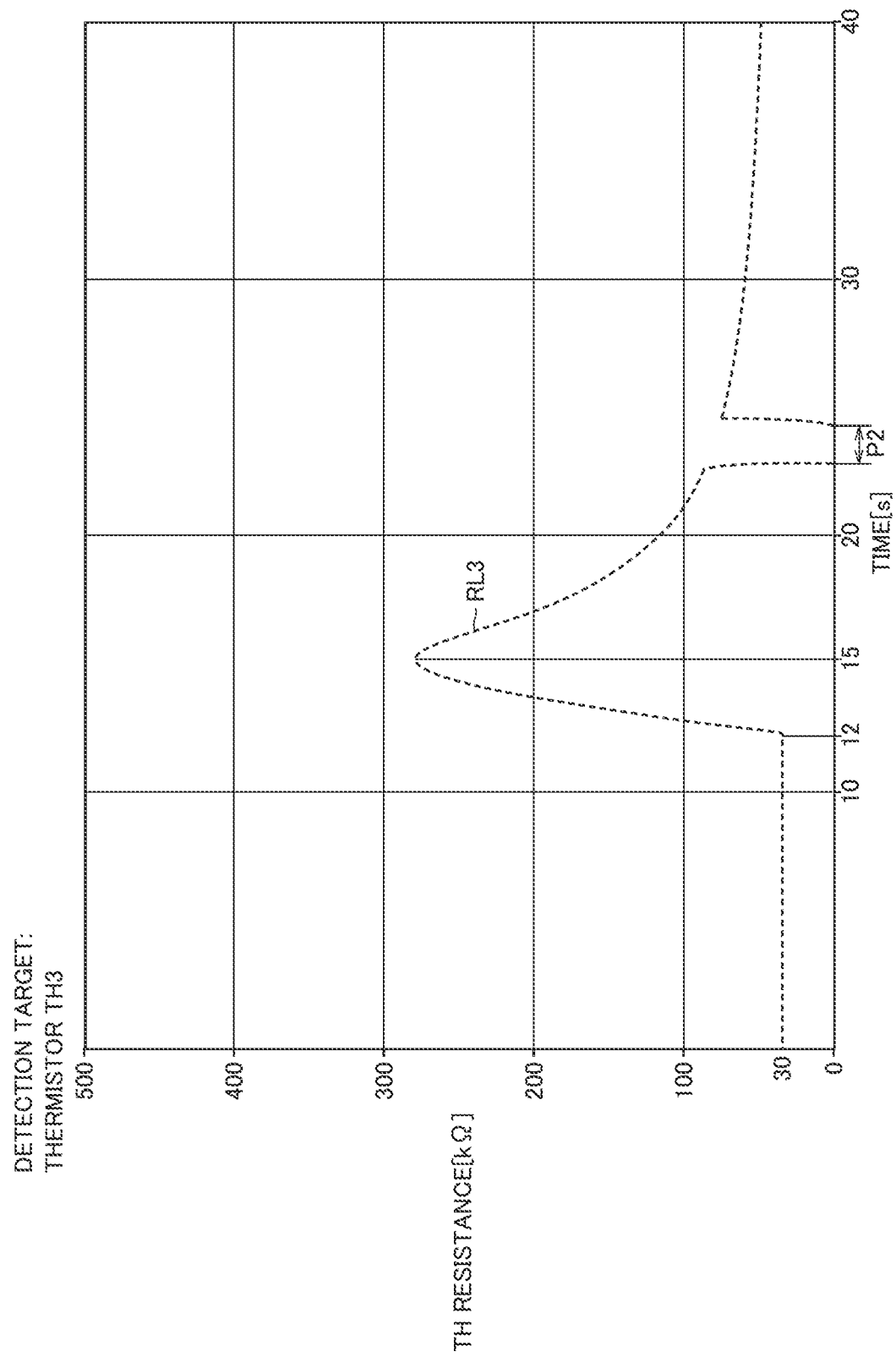
FIG. 4 shows transition of an electric resistance value of a thermistor.

FIG. 2 shows transition of an electric resistance value of a thermistor TH1. Thermistor TH1 is a thermistor that operates normally. FIG. 3 shows transition of an electric resistance value of a thermistor TH2. Thermistor TH2 is a thermistor having such a failure that an internal circuit enters an open state momentarily. FIG. 4 shows transition of an electric resistance value of a thermistor TH3. Thermistor TH3 is a thermistor having such a failure that an internal circuit enters a short-circuited state momentarily.

The transition of the electric resistance value when thermistor TH that is a detection target is cooled in the case where thermistor TH that is a detection target is normal, and the transition of the electric resistance value when thermistor TH that is a detection target is cooled in the case where thermistor TH that is a detection target is faulty will be separately described below with reference to FIGS. 2 to 4. The vertical axis in each of FIGS. 2 to 4 indicates the electric resistance value of thermistor TH that is a detection target. The horizontal axis in each of FIGS. 2 to 4 indicates the elapsed time from the start of measurement of the electric resistance value. Measurement unit 10 measures the electric resistance value for forty seconds.

Each of FIGS. 2 to 4 shows a measurement result when, during the measurement time period, the cooling process is started twelve seconds after the start of measurement of the electric resistance value, and three seconds after that, i.e., fifteen seconds after the start of measurement of the electric resistance value, the cooling process is ended. As described above, each of thermistor TH1 to thermistor TH3 that are detection targets is a negative temperature coefficient (NTC) thermistor in which the electric resistance value increases as the temperature decreases.

Thermistor TH1 that operates normally will be described with reference to FIG. 2. In the example shown in FIG. 2, the electric resistance value of thermistor TH1 starts to increase when twelve seconds have elapsed from the start of measurement of the electric resistance value. That is, cooling unit 30 starts the cooling process for thermistor TH1 when twelve seconds have elapsed. It can be seen that the electric resistance value of thermistor TH1 before the start of the cooling process is 30 kΩ.

Thereafter, the cooling process for thermistor TH1 stops when fifteen seconds have elapsed. As a result of the stop of cooling, the temperature of thermistor TH1 increases gradually. With the increase in the temperature of thermistor TH1, the electric resistance value of thermistor TH1 decreases gradually. The electric resistance value of thermistor TH1 increases to about 280 kΩ for three seconds after the start of the cooling process. However, even when forty seconds have elapsed, the electric resistance value of thermistor TH1 does not decrease to 30 kΩ after the cooling process is stopped. That is, a degree of increase in the electric resistance value of thermistor TH1 is steeper than a degree of decrease in the electric resistance value of thermistor TH1.

As shown in FIG. 2, when thermistor TH1 operates normally, the electric resistance value of thermistor TH1 increases during the time period in which the cooling process is performed on thermistor TH1, and after the cooling process stops, the electric resistance value of thermistor TH1 decreases gradually. As described above, the transition of the electric resistance value of thermistor TH1 that operates normally is as shown by a curve RL1.

The example in which the internal circuit of thermistor TH2 enters an open state momentarily will be described with reference to FIG. 3. In a time period P1, a curve RL2 shown in FIG. 3 is different from curve RL1 shown in FIG. 2.

In FIG. 3, twelve seconds after the start of measurement, i.e., shortly after the start of the cooling process, the electric resistance value of thermistor TH2 increases impulsively and thermistor TH2 enters the open state. For example, a portion where connection of the internal circuit of thermistor TH2 is insufficient may be affected by cooling and enter the open state momentarily. At this time, curve RL2 indicating the electric resistance value of thermistor TH2 increases steeply as shown in FIG. 3. After time period P1, the electric resistance value of thermistor TH2 returns to a normal value.

During time period P1, thermistor TH2 in FIG. 3 does not normally operate momentarily and has an operation failure. In addition, the electric resistance value of thermistor TH2 is abnormal only during time period P1. Although FIG. 3 illustrates time period P1 as a time period of approximately one second for easy understanding of the description, time period P1 is a very short time period shorter than one second.

The example in which the internal circuit of thermistor TH3 enters a short-circuited state momentarily will be described with reference to FIG. 4. In a time period P2, a curve RL3 shown in FIG. 4 is different from curve RL1 shown in FIG. 2.

In FIG. 4 as well, the cooling process is also ended fifteen seconds after the start of measurement of the electric resistance value. As shown in FIG. 4, after fifteen seconds have elapsed from the start of measurement, the electric resistance value of thermistor TH3 decreases gently for a while. However, when about twenty-third seconds have elapsed from the start of measurement, the electric resistance value of thermistor TH3 shows a short-circuited state of thermistor TH3 momentarily, and then, returns to a normal electric resistance value.

Therefore, during time period P2, thermistor TH3 in FIG. 4 does not normally operate momentarily and has an operation failure. That is, the electric resistance value of thermistor TH3 is abnormal only during time period P2. Although FIG. 4 illustrates time period P2 as a time period of approximately one second for easy understanding of the description, time period P2 is a very short time period shorter than one second.

As described above with reference to FIGS. 3 and 4, in the case where thermistor TH has a potential failure, the internal circuit may enter an open state or a short-circuited state momentarily, when a load such as the cooling process is applied to thermistor TH over time. Such a failure of thermistor TH that occurs momentarily at the time of application of the load cannot be detected using a method for temporarily measuring the electric resistance value of thermistor TH without applying the load.

The first embodiment provides a detection method for detecting a potential failure of thermistor TH by focusing attention on characteristics of thermistor TH.

<Procedure of Detection Process>

Figure 5:
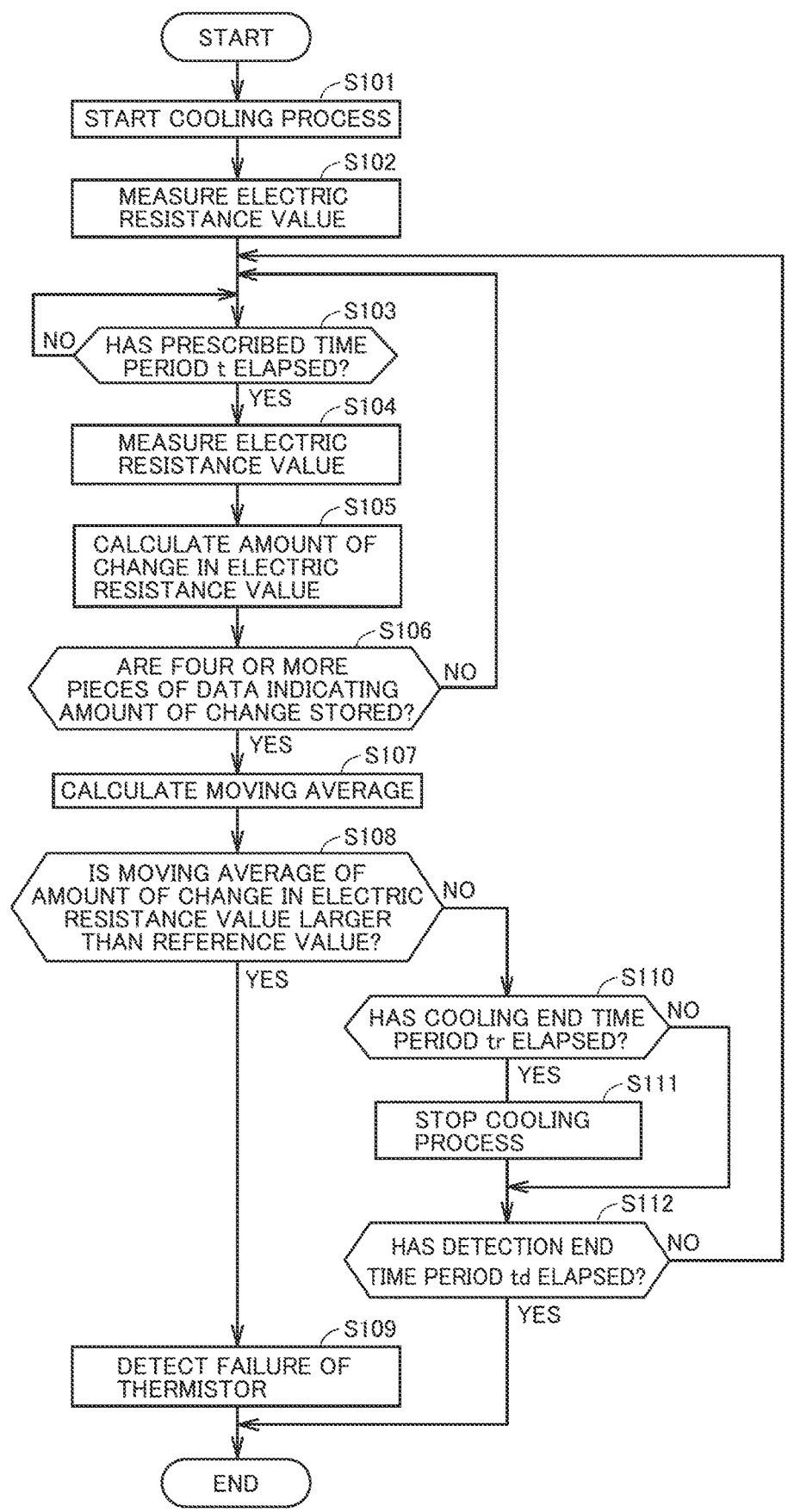
FIG. 5 is a flowchart showing an example process performed when the detection apparatus according to the first embodiment performs failure detection of a thermistor that is a detection target.

FIG. 5 is a flowchart showing an example process performed when detection apparatus 100 according to the first embodiment performs failure detection of thermistor TH that is a detection target. Detection apparatus 100 according to the present embodiment detects an abnormality of the electric resistance value of thermistor TH shown in each of FIGS. 3 and 4 by performing the flowchart shown in FIG. 5. The flowchart shown in FIG. 5 is performed by controller 20 of detection apparatus 100. Hereinafter, the flowchart in FIG. 5 performed by controller 20 may be simply referred to as "detection method".

First, controller 20 causes cooling unit 30 to start the cooling process of cooling thermistor TH (step S101). After starting the cooling process, cooling unit 30 continues the cooling process for a cooling end time period tr. Cooling end time period tr is, for example, three seconds, five seconds, ten seconds or the like.

Controller 20 causes measurement unit 10 to measure the electric resistance value of thermistor TH (step S102). In step S102, measurement unit 10 transmits the measured electric resistance value of thermistor TH to controller 20 as data.

Next, controller 20 determines whether or not a prescribed time period t has elapsed since measurement unit 10 measured the electric resistance value (step S103). The process in the flowchart shown in FIG. 5 is returned from step S106 or step S112 to step S103. That is, controller 20 repeatedly performs the process starting from step S103, until a prescribed condition is satisfied.

Hereinafter, of the process starting from step S103 and repeatedly performed, the process performed for the first time will be referred to as "first round of the process", the process performed for the second time will be referred to as "second round of the process", and the process performed for the third time will be referred to as "third round of the process". That is, when the process is returned to step S103, controller 20 increments a counter indicating which round of the process is performed.

In detection apparatus 100, prescribed time period t refers to a time period indicating an interval of measurement of the electric resistance value, and is predetermined. That is, until the prescribed condition is satisfied, controller 20 causes measurement unit 10 to measure the electric resistance value of thermistor TH that is a detection target, every time prescribed time period t elapses.

When controller 20 determines that prescribed time period t has not yet elapsed after the process in step S102 (NO in step S103), controller 20 causes the process to remain in step S103. While the first round of the process remains in step S103, the temperature of thermistor TH continues to decrease due to the cooling process.

Since the temperature of thermistor TH continues to change after the cooling process is started, the electric resistance value of thermistor TH after prescribed time period t elapses also changes. The cooling process in the first embodiment corresponds to "load" in the present disclosure.

When controller 20 determines that prescribed time period t has elapsed after the process in step S102 (YES in step S103), controller 20 causes measurement unit 10 to again measure the electric resistance value of thermistor TH (step S104). In step S104, measurement unit 10 transmits the measured electric resistance value of thermistor TH to controller 20 as data. As described above, the electric resistance value of thermistor TH changes over time. Therefore, the data about the electric resistance value received by controller 20 in step S102 corresponds to data indicating the electric resistance value before change, and the data in step S104 in the first round of the process corresponds to data indicating the electric resistance value after change.

The data indicating the electric resistance value before change corresponds to "first data" in the present disclosure. The data indicating the electric resistance value after change corresponds to "second data" in the present disclosure.

Controller 20 calculates an amount of change in the electric resistance value using the first data and the second data (step S105). That is, controller 20 calculates the amount of change in the electric resistance value per prescribed time period t. Controller 20 causes at least one of the RAM and the ROM to store the calculated amount of change as data. The amount of change refers to a difference between the electric resistance value before change and the electric resistance value after change.

The time at which the electric resistance value before change is measured corresponds to "first time" in the present disclosure. The time at which the electric resistance value after change is measured corresponds to "second time" in the present disclosure. The electric resistance value of thermistor TH corresponds to "physical property value of the thermistor" in the present disclosure.

Controller 20 determines whether or not four or more pieces of data about the amount of change calculated in step S105 are stored (step S106). When controller 20 determines that four or more pieces of data about the amount of change are not stored (NO in step S106), controller 20 returns the process to step S103. At this time, controller 20 determines that the first round of the process has ended and the second round of the process has started, and increments the counter. After prescribed time period t elapses, controller 20 causes measurement unit 10 to again measure the electric resistance value (step S104). Controller 20 calculates the amount of change in the electric resistance value by using the data about the electric resistance value in step S104 in the first round of the process as data before change, and the data about the electric resistance value in step S104 in the second round of the process as data after change (step S105). Thereafter, controller 20 returns the process from step S106 to step S103 and starts the third round of the process. In this way, controller 20 repeats the process until four or more pieces of data about the amount of change are stored.

When controller 20 determines that four or more pieces of data about the amount of change are stored (YES in step S106), controller 20 calculates a moving average value based on the four pieces of data about the amount of change in the electric resistance value (step S107).

The moving average value refers to a value calculated using a moving average method. The moving average method refers to a method for smoothing time-series data by dividing a sum of pieces of changing data within a range by the number of the pieces of data. By smoothing the time-series data, erroneous detection in which thermistor TH is determined as abnormal although thermistor TH is normal can be prevented in detection apparatus 100. Details about the moving average will be described below. Controller 20 calculates the moving average value based on the four pieces of data about the amount of change in the electric resistance value per prescribed time period t. The number of pieces of data for calculating the moving average value may be any number other than four.

Controller 20 determines whether or not the calculated moving average value of the amount of change in the electric resistance value is larger than a reference value (step S108).

The reference value refers to a predetermined value for determining that thermistor TH is faulty when the calculated moving average value of the amount of change is larger than the reference value. The reference value indicates an absolute value of the amount of change. That is, the calculated amount of change being larger than the reference value means that the electric resistance value of thermistor TH increases or decreases steeply. When controller 20 determines that the electric resistance value of thermistor TH changes steeply based on the moving average value of the amount of change per prescribed time period t, controller 20 determines that thermistor TH is faulty.

When controller 20 determines that the moving average value of the amount of change in the electric resistance value per prescribed time period t is equal to or smaller than the reference value (NO in step S108), controller 20 determines whether or not cooling end time period tr has elapsed from the start of the cooling process (step S110). When controller 20 determines that cooling end time period tr has elapsed (YES in step S110), controller 20 stops the cooling process started in step S101 (step S111), and moves the process to step S112.

When controller 20 determines that cooling end time period tr has not elapsed (NO in step S110), controller 20 does not stop the cooling process started in step S101, and moves the process to step S112.

Controller 20 determines whether or not a detection end time period td has elapsed from the start of the cooling process (step S112). Detection end time period td refers to a maximum time period in which the detection process is performed on thermistor TH that is a detection target, after the start of the cooling process. Detection end time period td is predetermined, and is, for example, thirty seconds from the start of measurement by measurement unit 10. Detection end time period td may be any time period other than thirty seconds, and may be, for example, forty seconds.

When controller 20 determines that detection end time period td has elapsed from the start of the cooling process (YES in step S108), controller 20 ends the process. That is, when controller 20 cannot detect a failure of thermistor TH by the time detection end time period td elapses, controller 20 determines that thermistor TH that is a detection target is not faulty.

When controller 20 determines that detection end time period td has not elapsed (NO in step S112), controller 20 returns the process to step S103. Thereafter, controller 20 determines whether or not prescribed time period t has elapsed from the last measurement of the electric resistance value by measurement unit 10 (step S103).

When controller 20 determines that prescribed time period t has elapsed (YES in step S103), controller 20 causes measurement unit 10 to again measure the electric resistance value of thermistor TH (step S104).

Next, controller 20 calculates an amount of change from the electric resistance value of thermistor TH before prescribed time period t elapses to the electric resistance value of thermistor TH after prescribed time period t elapses (step S105). Controller 20 calculates a moving average value of the calculated amount of change in the electric resistance value (step S107), and determines whether or not the moving average value is larger than the reference value (step S108).

As described above, controller 20 repeatedly performs the process from step S103 until a failure of thermistor TH is detected or detection end time period td elapses. That is, controller 20 causes measurement unit 10 to measure the electric resistance value of thermistor TH at every prescribed time period t, and calculates the amount of change from the previously measured electric resistance value.

In the detection method performed by detection apparatus 100, after the cooling process for thermistor TH is started, the electric resistance value of thermistor TH is continuously measured at every prescribed time period t. When the moving average value of the amount of change larger than the reference value is calculated, controller 20 determines that the electric resistance value of thermistor TH is abnormal, and detects that thermistor TH is faulty.

Although a failure of the thermistor is calculated by comparing the moving average value of the amount of change in the electric resistance value with the reference value in the flowchart shown in FIG. 5, the moving average value may not be calculated. That is, controller 20 may calculate a failure of the thermistor by comparing the amount of change in the electric resistance value with the reference value.

Step S101 in FIG. 5 corresponds to "applying a load" in the present disclosure. Steps S102 and S104 in FIG. 5 correspond to "measuring a physical property value of the thermistor" in the present disclosure. Step S108 in FIG. 5 corresponds to "detecting the failure" in the present disclosure. Controller 20 in step S108 functions as "detection unit" in the present disclosure.

<Detection Method Using Amount of Change>

Figure 6:
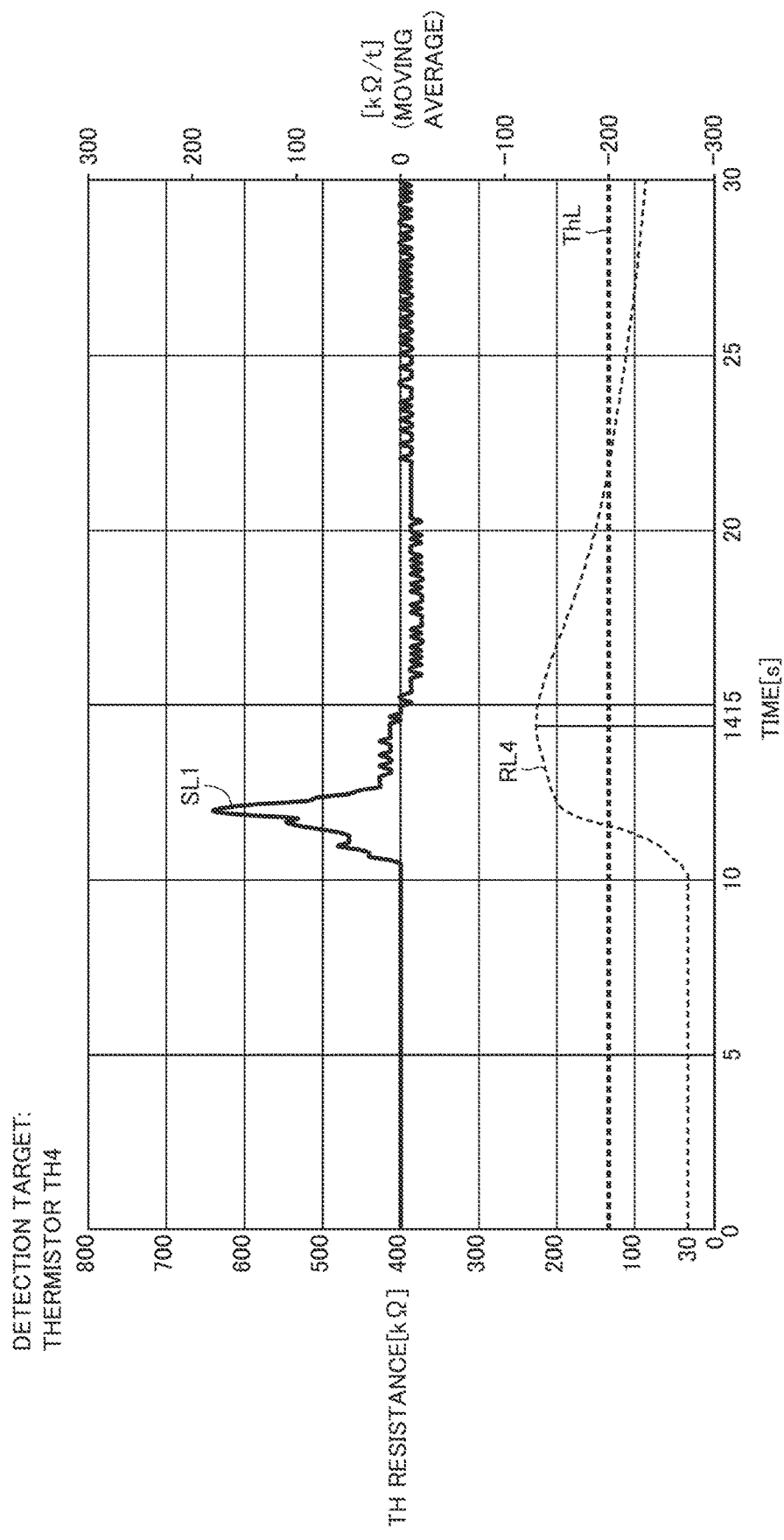
FIG. 6 shows transition of an electric resistance value and a moving average value of a thermistor.

FIG. 6 shows transition of an electric resistance value and a moving average value of a thermistor TH4. Thermistor TH4 is a normal thermistor that does not have a potential failure. The graph shown in FIG. 6 is a graph obtained by applying the detection process described with reference to FIG. 5.

The horizontal axis indicates the elapsed time from the start of measurement of thermistor TH4 by measurement unit 10. The left vertical axis and a curve RL4 indicate transition of the electric resistance value of thermistor TH4. Referring to the left vertical axis and curve RL4, it can be seen that the electric resistance value of thermistor TH4 is 30 kΩ until ten seconds elapse from the start of measurement by measurement unit 10.

The right vertical axis and a curve SL1 indicate the moving average value of the amount of change in the electric resistance value at every prescribed time period t. For example, referring to curve RL4, the electric resistance value of thermistor TH4 increases after ten seconds elapse from the start of the cooling process. Therefore, curve SL1 indicating the moving average value of the amount of change in the electric resistance value also increases after ten seconds elapse.

Detection apparatus 100 sets ten seconds from the start of measurement of thermistor TH4 by measurement unit 10 as a preparation time period and starts the flowchart shown in FIG. 5 when ten seconds elapse. That is, cooling unit 30 starts the cooling process when ten seconds elapse, and stops the cooling process when fourteen seconds elapse. In the example shown in FIG. 6, cooling unit 30 stops the cooling process when four seconds elapse after the start of the cooling process.

Controller 20 receives the electric resistance value of thermistor TH4 from measurement unit 10 at every prescribed time period t. Based on the received electric resistance value, controller 20 calculates a curve RL approximately. That is, curve RL shown in FIG. 6 approximately illustrates a plurality of electric resistance values at every prescribed time period t as a curve.

A reference value ThL refers to an amount of change per predetermined prescribed time period t, and refers to a reference value for determining whether or not thermistor TH4 is faulty. In the example shown in FIG. 6, reference value ThL is determined as an amount of change of 200 kΩ per prescribed time period t. Here, controller 20 compares a moving average value of an amount of decrease in the electric resistance value with reference value ThL. That is, controller 20 does not use an amount of increase in the electric resistance value as a comparison target for detecting a failure of thermistor TH. That is, when the moving average value of the amount of change is below −200 kΩ per prescribed time period t, controller 20 detects that thermistor TH is faulty. Hereinafter, the amount of decrease in the electric resistance value may be referred to as "amount of change in a negative direction", and the amount of increase in the electric resistance value may be referred to as "amount of change in a positive direction".

As described above, thermistor TH4 that is a detection target in FIG. 6 operates normally. Therefore, curve SL1 does not fall below reference value ThL throughout the measurement time period. Detection apparatus 100 according to the first embodiment determines that thermistor TH4 is not faulty.

In an aspect, controller 20 may calculate an approximate curve of curve RL1 as a function. In this case, controller 20 calculates curve SL1 as a derivative function of curve RL1.

That is, curve SL1 indicates the amount of change in the electric resistance value in a very small amount of time of curve RL1, which is an approximate curve. Reference value ThL is a predetermined derivative coefficient.

Figure 7:
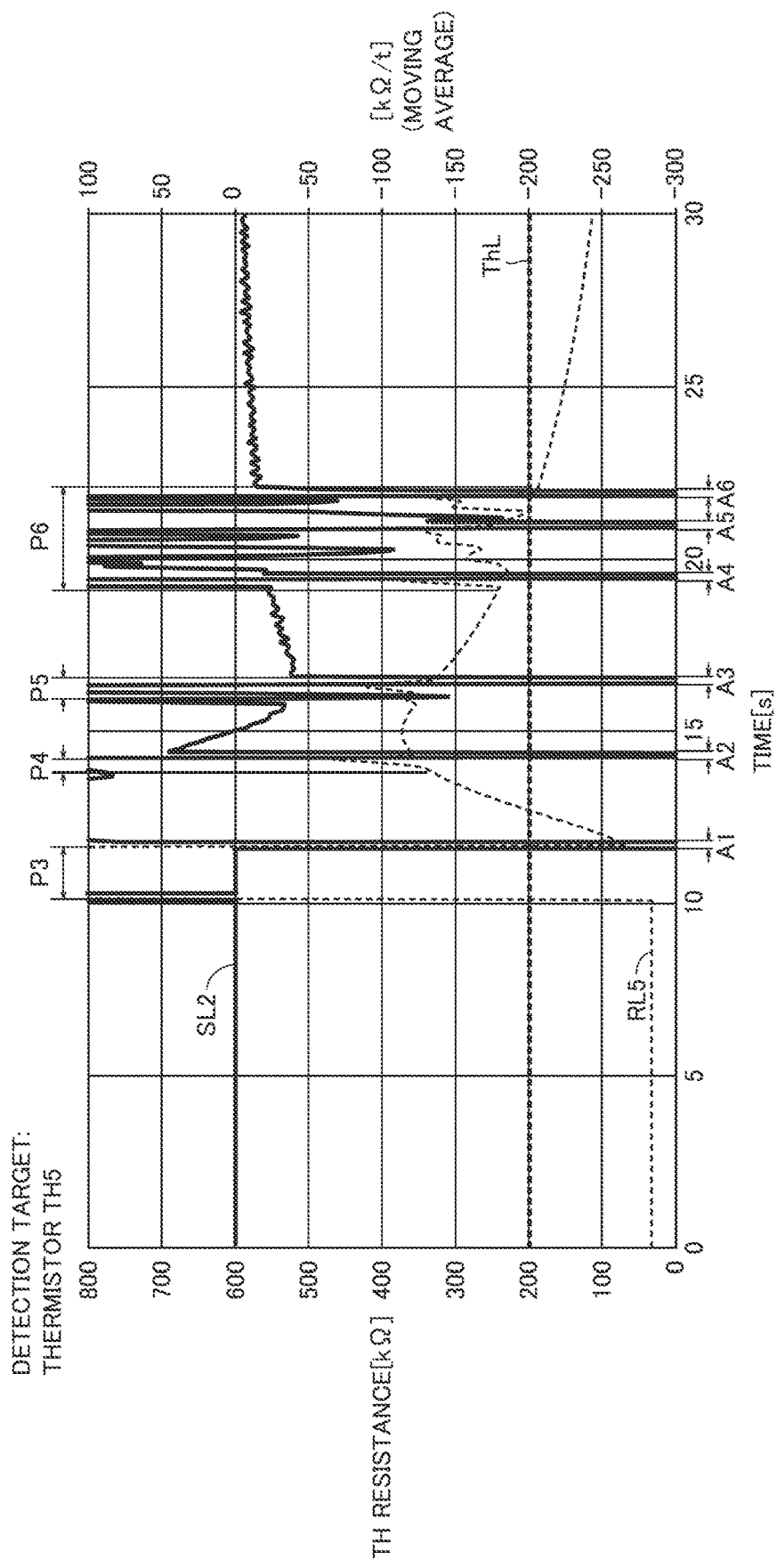
FIG. 7 shows transition of an electric resistance value and a moving average value of a thermistor.

FIG. 7 shows transition of an electric resistance value and a moving average value of a thermistor TH5. Thermistor TH5 is a thermistor having such a failure that an internal circuit enters an open state momentarily. The graph shown in FIG. 7 is a graph obtained by applying the detection process described with reference to FIG. 5.

Similarly to FIG. 6, in FIG. 7, the horizontal axis indicates the elapsed time from the start of measurement of thermistor TH5 by measurement unit 10. The left vertical axis and a curve RL5 indicate transition of the electric resistance value of thermistor TH5. The right vertical axis and a curve SL2 indicate the moving average value of the amount of change in the electric resistance value at every prescribed time period t.

As shown in FIG. 7, curve RL5 shows the electric resistance value exceeding 800 kΩ during a time period P3. That is, an electric circuit including thermistor TH5 is in an open state during time period P3.

Similarly to FIG. 6, controller 20 calculates curve SL2 indicating the moving average value of the amount of change in the electric resistance value. When time period P3 ends, the electric resistance value of thermistor TH5 steeply decreases from the electric resistance value showing the open state to a normal value.

With such a steep decrease, curve SL2 indicating the moving average value of the amount of change in the electric resistance value also steeply increases and decreases at the same time. Therefore, during a time period A1, the moving average value of the amount of change indicated by curve SL2 is below reference value ThL. During time period A1, the amount of change in the negative direction in the electric resistance value is larger than 200 kΩ per prescribed time period t, which is reference value ThL.

Thus, during time period A1, controller 20 can detect that thermistor TH5, which is a target of detection by detection apparatus 100, is faulty.

In the detection method performed by detection apparatus 100, the process may be ended when the amount of change in the electric resistance value indicated by curve SL2 falls below reference value ThL. For purposes of explanation, FIG. 7 illustrates curve RL5 and curve SL2 when measurement unit 10 continues to measure the electric resistance value after time period A1.

As described above, in the detection method performed by detection apparatus 100, the possibility of detecting a failure of thermistor TH5 even when time period P3 is very short is enhanced, as compared with the case of focusing attention only on the electric resistance value without taking the amount of change into consideration. That is, since time period P3 is shorter than prescribed time period t, a failure of thermistor TH5 cannot be detected when the amount of change in the electric resistance value is not taken into consideration, if measurement unit 10 cannot measure the electric resistance value of thermistor TH5 during time period P3.

However, by focusing attention on the amount of change as in detection apparatus 100, return from the open state to the normal state can be detected based on the amount of change in the electric resistance value during and around time period P3, even if measurement unit 10 cannot measure the electric resistance value during time period P3. Therefore, in the detection method performed by detection apparatus 100, it is easier to detect, as faulty, thermistor TH showing an abnormal electric resistance value momentarily, as compared with the case of simply focusing attention only on the electric resistance value.

Furthermore, thermistor TH5 that is a target of detection by detection apparatus 100 in FIG. 7 repeats steep increases and decreases in the electric resistance value sporadically during time periods P4, P5 and P6. Thus, during time periods P4, P5 and P6, although the electric circuit including thermistor TH5 does not enter the open state, the electric resistance value of thermistor TH5 repeats steep increases and decreases, as compared with the electric resistance value of normal thermistor TH1 shown in FIG. 2.

In the detection method in the first embodiment, the sporadic steep increases and decreases in the electric resistance value, which occur during time periods A2, A3, A4, A5, and A6 and do not cause the electric circuit including thermistor TH5 to enter the open state, can also be detected as a failure of thermistor TH5.

In addition, in the detection method performed by detection apparatus 100, the load applied to thermistor TH5 is the cooling process, and thus, only the moving average value in the negative direction in the amount of change is compared with reference value ThL. In other words, controller 20 does not include, in a comparison target, the moving average value in the positive direction in the amount of change. This is because the amount of change in the electric resistance value is steeper when the cooling process is performed by cooling unit 30 and thereby the temperature of thermistor TH5 decreases, as compared with when the cooling process is stopped and thereby the temperature of thermistor TH5 increases.

As shown in FIG. 7, during a time period from when twelve seconds elapse to when fifteen seconds elapse, the electric resistance value of thermistor TH5 increases steeply. This is because the amount of change in the increasing direction in the electric resistance value of thermistor TH5 is larger, as compared with the case in which after the cooling process is stopped, natural convection causes heat exchange for the air around thermistor TH and thereby the temperature of thermistor TH5 increases gradually.

Therefore, in the detection method performed by detection apparatus 100 according to the first embodiment, a failure of thermistor TH5 is detected based on the condition of whether or not the calculated amount of change in the negative direction in the electric resistance value is larger than reference value ThL. If the calculated amount of change in the positive direction in the electric resistance value is compared with reference value ThL, there is a higher possibility that controller 20 erroneously detects the steep increase in the electric resistance value caused by the cooling process by cooling unit 30 as a failure of thermistor TH5.

Therefore, in the detection method performed by detection apparatus 100, a failure of thermistor TH5 is detected based on the condition of whether or not the amount of change in the negative direction in the electric resistance value is larger than reference value ThL, thereby preventing the steep increase in the electric resistance value caused by the cooling process by cooling unit 30 from being erroneously detected as a failure of thermistor TH5.

The example in which a failure is detected based on the amount of change in the negative direction in the electric resistance value when the electric circuit including thermistor TH5 enters the open state has been described with reference to FIG. 7. When the electric circuit including thermistor TH5 enters a short-circuited state, the electric resistance value decreases steeply. Therefore, in the detection method performed by detection apparatus 100, a failure of thermistor TH5 can be detected even when the electric circuit including thermistor TH5 enters the short-circuited state.

FIG. 7 shows the example in which measurement unit 10 measures the electric resistance value throughout the time period from the start of measurement by measurement unit 10 to detection end time period td. However, controller 20 may stop the process when controller 20 detects an abnormality of thermistor TH5 during time period A1.

<Smoothing By Moving Average>

Figure 8:
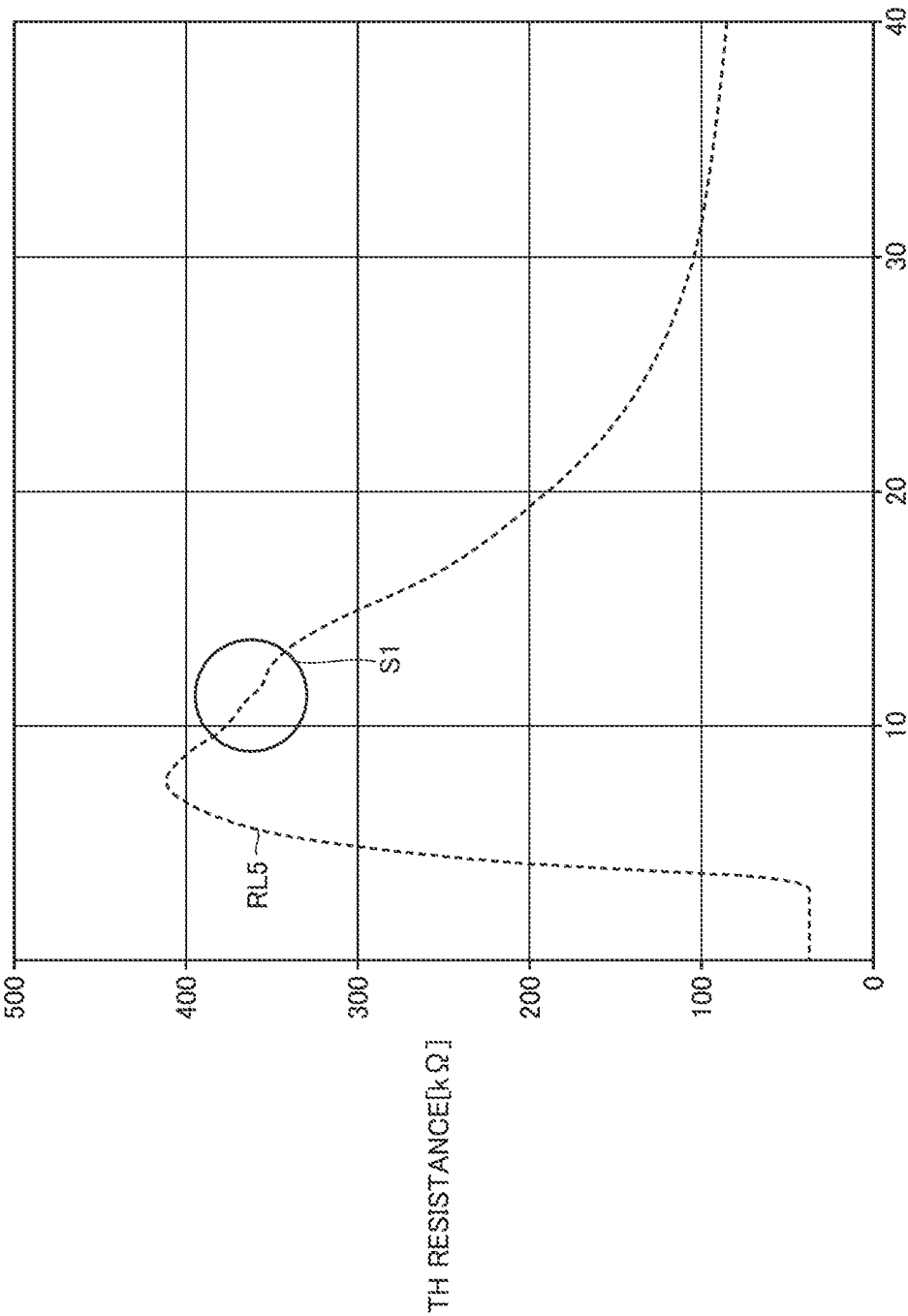
FIG. 8 shows an example in which an amount of change in an electric resistance value increases steeply in a thermistor that operates normally.

FIG. 8 shows an example in which an amount of change in an electric resistance value increases steeply in a thermistor TH6 that operates normally. The vertical axis in FIG. 8 indicates the electric resistance value of thermistor TH6. The horizontal axis in FIG. 8 indicates the elapsed time from the start of measurement by measurement unit 10. The advantages of calculating the amount of change in the electric resistance value and then calculating the moving average value in detection apparatus 100 will be described below.

In FIG. 8, thermistor TH6 that is a target of detection by detection apparatus 100 is a thermistor that operates normally. Therefore, the electric resistance value of thermistor TH6 measured by measurement unit 10 does not show an abnormal value as in FIG. 3 or FIG. 4. That is, an electric circuit including thermistor TH6 does not enter an open state or a short-circuited state.

In addition, the electric resistance value of thermistor TH6 measured by measurement unit 10 does not repeat increases and decreases sporadically as in time periods P4, P5 and P6 in FIG. 7.

That is, in FIG. 8, the amount of change in the electric resistance value of thermistor TH6 is relatively gentle until forty seconds have elapsed since thermistor TH6 was connected to measurement unit 10. However, as shown by a region S1, the shape of curve RL5 may have more or less unevenness. Due to such unevenness in region S1, the amount of change may be determined as large, when attention is focused on the amount of change in a short time period.

Figure 9:
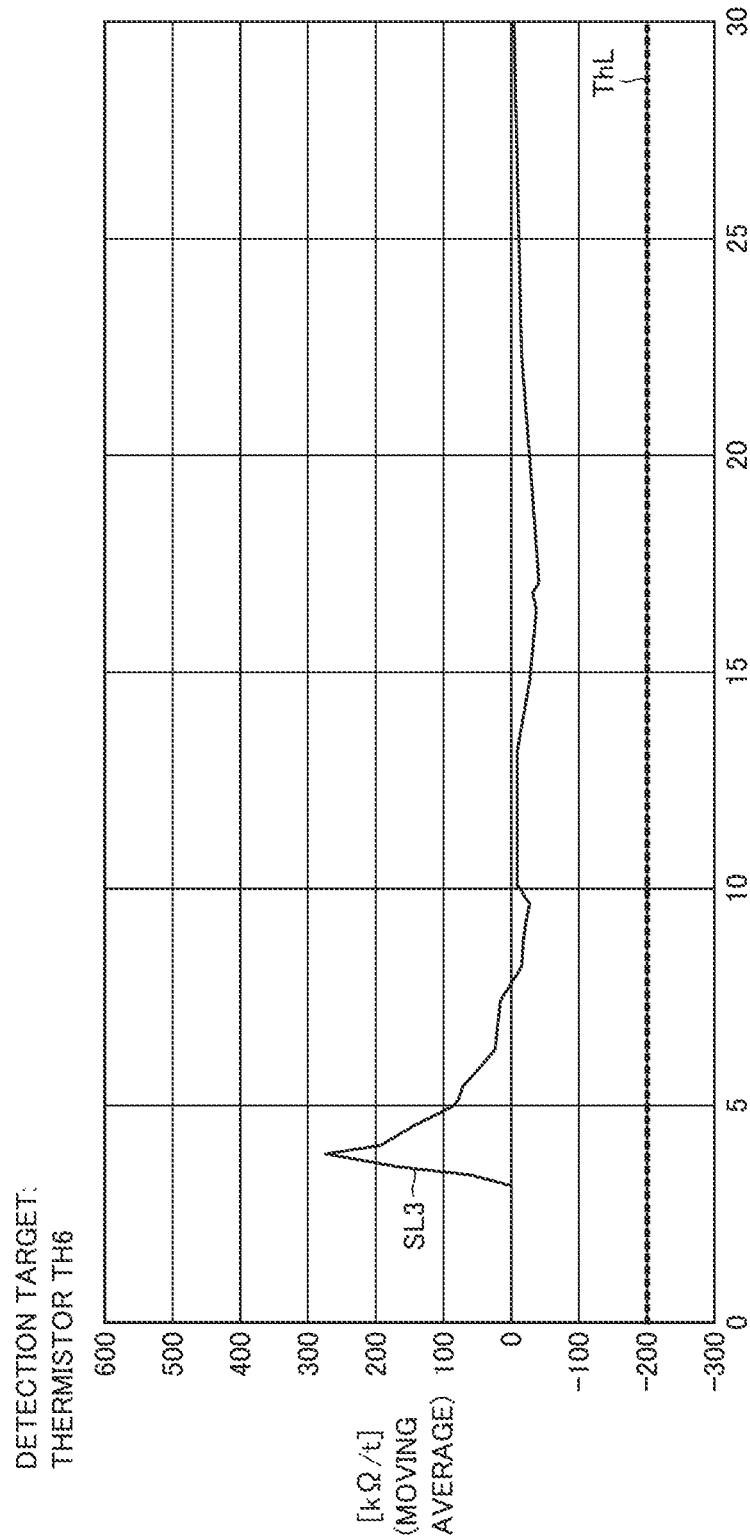
FIG. 9 shows a moving average value of the amount of change in the electric resistance value per prescribed time period in FIG. 8.

FIG. 9 shows a moving average value of the amount of change per prescribed time period t in the electric resistance value in FIG. 8. Controller 20 calculates the amount of change in the electric resistance value at every prescribed time period t.

Furthermore, controller 20 calculates a moving average value of the calculated amount of change per prescribed time period t. As a result, controller 20 obtains a curve SL3 as transition of the moving average value of the amount of change per prescribed time period t. By calculating the moving average value, curve SL3 is smoothed. That is, curve SL3 becomes gentle.

As described with reference to FIG. 8, thermistor TH6 that is a detection target operates normally, and thus, the moving average value of the amount of change per prescribed time period t does not become larger than reference value ThL in the negative direction by the time detection end time period td elapses. Therefore, controller 20 determines that thermistor TH6 is not faulty.

Figure 10:
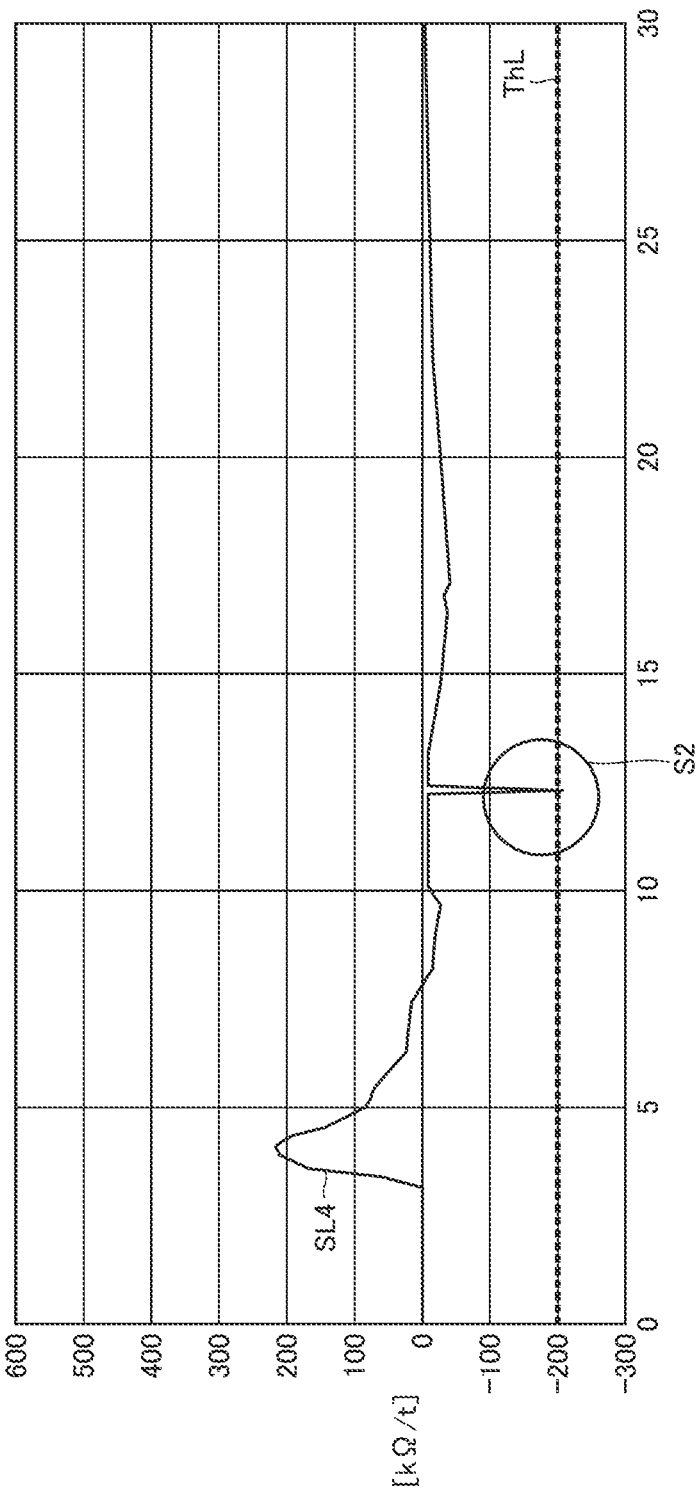
FIG. 10 shows an amount of change in the electric resistance value when the moving average value is not calculated.

FIG. 10 is a graph showing an amount of change in the electric resistance value when the moving average value is not calculated. A thermistor that is a detection target in FIG. 10 is the same as thermistor TH6 that is a detection target in FIG. 9. A curve SL4 shown in FIG. 10 is a curve indicating an amount of change per prescribed time period t before calculating the moving average value indicated by curve SL3 in FIG. 9. That is, curve SL4 is a curve before calculating the moving average value indicated by curve SL3. Therefore, curve SL4 is not smoothed.

A region S2 indicates the amount of change in the electric resistance value in region S1 in FIG. 8. In region S2, the amount of change in the electric resistance value is larger than reference value ThL. That is, when the moving average value is not calculated, controller 20 calculates the unevenness in region S1 as a steep change.

As described above, when the moving average value is not calculated, controller 20 determines the more or less unevenness of the shape of curve RL5 in region S1 in FIG. 8 as an amount of steep change. As a result, controller 20 erroneously detects thermistor TH6 as faulty, although thermistor TH6 operates normally. Therefore, in the first embodiment, the moving average method is used in order to prevent erroneous detection of a failure.

Second Embodiment

In the first embodiment, the cooling process is performed as a method for applying a load to thermistor TH that is a detection target. However, the method for applying a load to thermistor TH is not limited to the cooling process.

Description of a configuration of a detection apparatus 100A according to a second embodiment that is the same as that of detection apparatus 100 according to the first embodiment will not be repeated.

Figure 11:
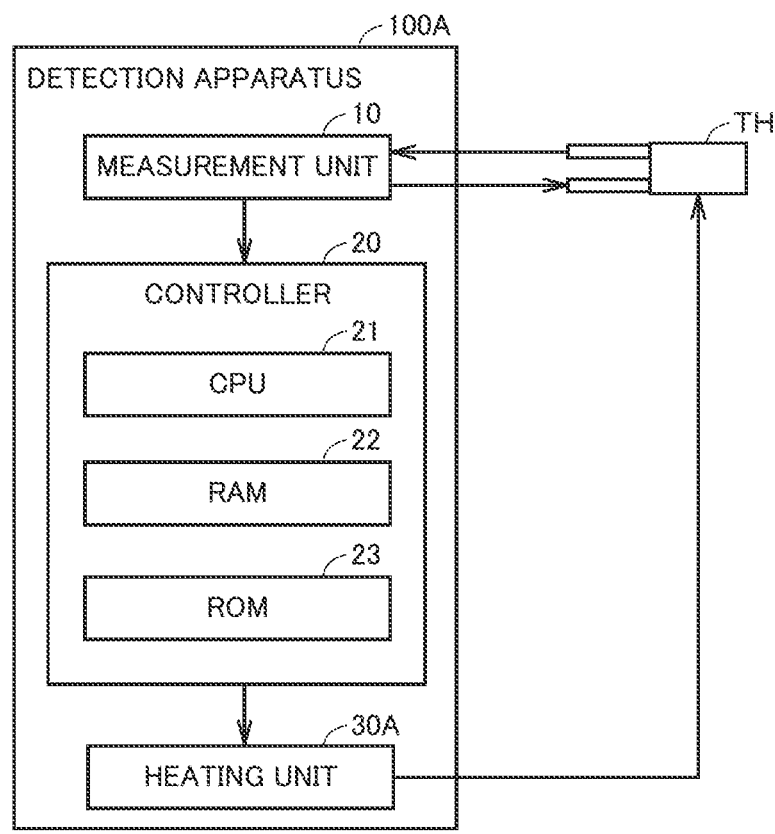
FIG. 11 schematically shows an example configuration of a detection apparatus according to a second embodiment that detects a failure of a thermistor.

FIG. 11 schematically shows an example configuration of detection apparatus 100A according to the second embodiment that detects a failure of thermistor TH. Detection apparatus 100A includes a heating unit 30A. Heating unit 30A blows hot air into thermistor TH that is a detection target. As a result, the temperature of thermistor TH increases. Heating unit 30A includes a heater and a blower, for example. In an aspect, heating unit 30A may include only a heater. Hereinafter, heating of thermistor TH by heating unit 30A will be referred to as "heating process". The heating process in the second embodiment corresponds to "load" in the present disclosure.

In addition, in a detection method performed by detection apparatus 100A according to the second embodiment, a reference value ThH, not reference value ThL, is predetermined. Reference value ThH is, for example, an amount of change of 150 kΩ per prescribed time period t.

Unlike the first embodiment, controller 20 compares the moving average value of the amount of change in the positive direction with reference value ThH. That is, controller 20 in the second embodiment does not include, in a comparison target, the moving average value of the amount of change in the negative direction.

Figure 12:
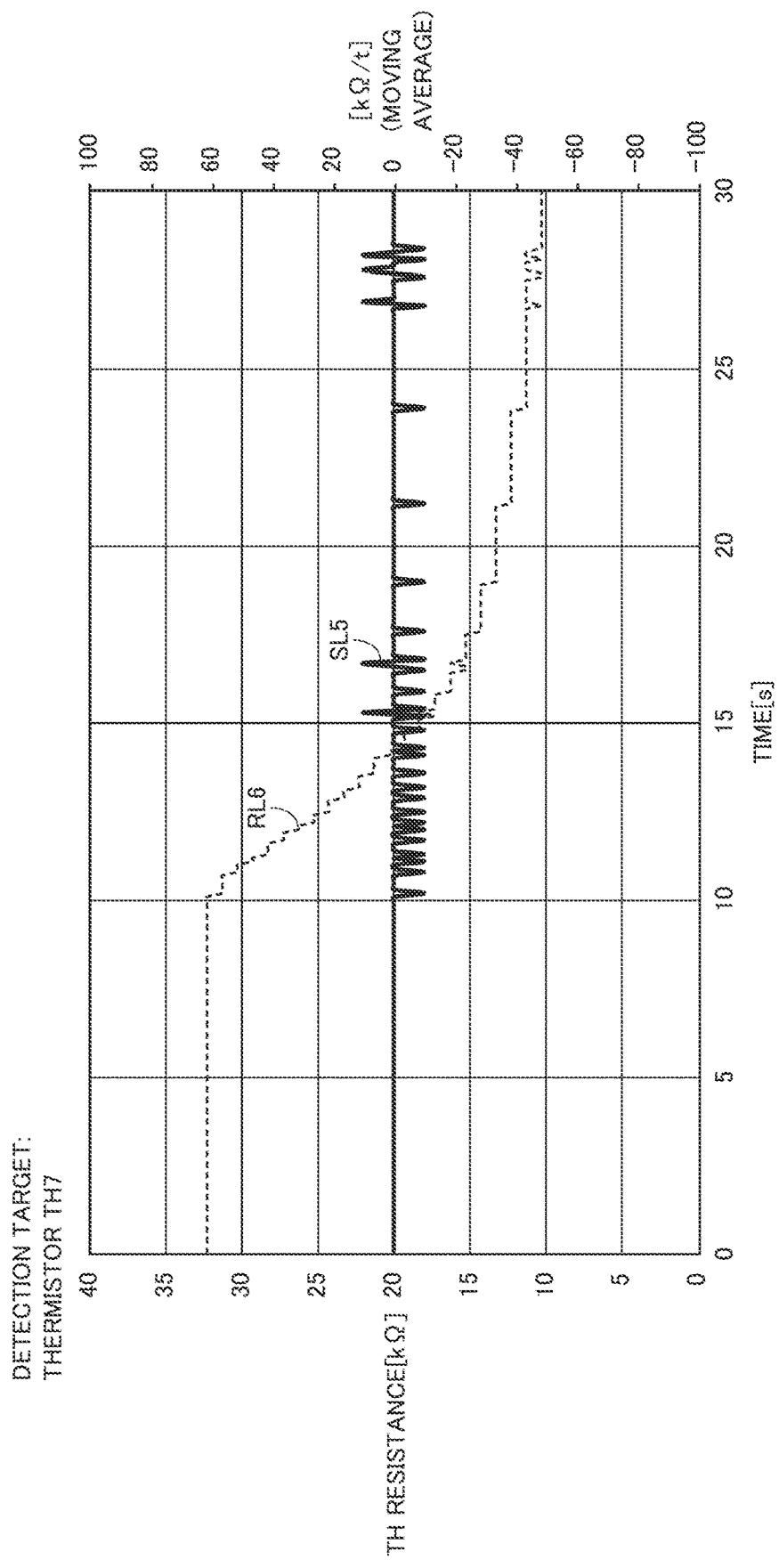
FIG. 12 shows transition of an electric resistance value and a moving average value of a thermistor.

FIG. 12 shows transition of an electric resistance value and a moving average value of a thermistor TH7. Thermistor TH7 is a normal thermistor that does not have a potential failure.

In the second embodiment, heating unit 30A starts to blow hot air when ten seconds elapse from the start of measurement of thermistor TH7 by measurement unit 10. The electric resistance value of thermistor TH7 decreases as the temperature increases. A curve RL6 indicates the electric resistance value of thermistor TH7. A curve SL5 indicates the moving average value of the amount of change in the electric resistance value of thermistor TH7.

As shown in FIG. 12, the electric resistance value of thermistor TH7 does not show an abnormal value as in FIG. 3 or FIG. 4.

Therefore, throughout the time period of the detection process, the moving average value of the amount of change in the electric resistance value of thermistor TH7 indicated by curve SL5 is approximately within a range of −10 kΩ to 10 kΩ. Therefore, the moving average value of the amount of change does not exceed reference value ThH, which is the amount of change of 150 kΩ, and thus, controller 20 determines that thermistor TH7 is not faulty.

FIG. 13 shows transition of an electric resistance value and a moving average value of a thermistor TH8. Thermistor TH8 is a thermistor having such a failure that an internal circuit enters an open state momentarily.

A curve RL7 indicates the electric resistance value of thermistor TH8. A curve SL6 indicates the moving average value of the amount of change in the electric resistance value of thermistor TH8. In FIG. 13, during time periods P7, P8 and P9, the electric resistance value of thermistor TH8 increases steeply and the internal circuit of thermistor TH8 enters the open state.

During time periods P7, P8 and P9, the moving average value of the amount of change in the positive direction in the electric resistance value of thermistor TH8 indicated by curve SL6 is larger than reference value ThH. That is, the moving average value of the amount of change in the electric resistance value is equal to or larger than 150 kΩ per prescribed time period t.

Thus, since the moving average value of the amount of change in the electric resistance value exceeds reference value ThH, controller 20 can detect that thermistor TH8 is faulty.

In addition, in the detection method performed by detection apparatus 100A, the load applied to thermistor TH8 is the heating process, and thus, controller 20 compares the amount of change in the positive direction with reference value Th. In other words, in the detection method performed by detection apparatus 100A, a failure of thermistor TH8 is detected based on the condition of whether or not the calculated amount of change in the positive direction in the electric resistance value is larger than reference value ThH.

Thus, in the detection method performed by detection apparatus 100A, it is possible to prevent the increase in the electric resistance value caused by the heating process by heating unit 30A from being erroneously detected as a failure of thermistor TH.

Controller 20 may stop the process when controller 20 detects an abnormality for the first time during time period P7, or may stop the process when controller 20 detects an abnormality the predetermined number of times. In FIG. 13, controller 20 stops measurement by measurement unit 10 after time period P9 elapses.

The load applied to thermistor TH that is a detection target is not limited to changing the temperature of thermistor TH, and may be providing vibrations to thermistor TH. Providing vibrations corresponds to "load" in the present disclosure. Controller 20 determines whether or not the moving average value of the amount of change in the electric resistance value becomes larger than the reference value during a time period in which vibrations are being provided to thermistor TH, and thereby, controller 20 can detect a failure.

SUMMARY

The first and second embodiments will be summarized below.

A detection method for detecting a failure of a thermistor according to the first and second embodiments includes: applying a load including a cooling process, a heating process and vibrations to the thermistor over time; measuring a physical property value of the thermistor at least at a first time and a second time during a time period in which the load is being applied to the thermistor; and detecting the failure of the thermistor based on first data indicating the physical property value of the thermistor measured at the first time and second data indicating the physical property value of the thermistor measured at the second time.

Thus, in the detection method according to the present disclosure, the physical property value of the thermistor is measured at least at the first time and the second time, of the time period in which the load is being applied to the thermistor. Therefore, it is easier to detect, as faulty, a thermistor showing an abnormal physical property value in a short time period.

Preferably, detecting the failure of the thermistor includes: calculating an amount of change in the physical property value per prescribed time period t, based on a difference between the physical property value indicated by the first data and the physical property value indicated by the second data, and a difference between the first time and the second time; and detecting the failure of the thermistor by comparing the amount of change in the physical property value per prescribed time period t with a reference value.

Preferably, detecting the failure of the thermistor includes detecting the failure of the thermistor by comparing a moving average value of the amount of change in the physical property value with a reference value.

Preferably, in applying the load to the thermistor, a temperature of the thermistor is changed.

Preferably, the physical property value is an electric resistance value of the thermistor.

Preferably, in detecting the failure of the thermistor, an amount of decrease in the electric resistance value, of the amount of change in the physical property value, is compared with a reference value, when the temperature of the thermistor is decreased in applying the load.

Preferably, in detecting the failure of the thermistor, an amount of increase in the electric resistance value, of the amount of change in the physical property value, is compared with a reference value, when the temperature of the thermistor is increased in applying the load.

Preferably, in applying the load to the thermistor, vibrations are provided to the thermistor.

Detection apparatus 100 that detects a failure of a thermistor includes: cooling unit 30 or heating unit 30A that applies a load to the thermistor over time; measurement unit 10 that measures a physical property value of the thermistor at least at a first time and a second time during a time period in which the load is being applied to the thermistor; and a detection unit that detects the failure of the thermistor based on first data indicating the physical property value of the thermistor measured at the first time and second data indicating the physical property value of the thermistor measured at the second time.

A detection system that detects a failure of a thermistor includes: cooling unit 30 or heating unit 30A that applies a load to the thermistor over time; measurement unit 10 that measures a physical property value of the thermistor at least at a first time and a second time during a time period in which the load is being applied to the thermistor; and a detection unit that detects the failure of the thermistor based on first data indicating the physical property value of the thermistor measured at the first time and second data indicating the physical property value of the thermistor measured at the second time.

Although the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A detection method for detecting a failure of a thermistor, the detection method comprising:
    applying a load to the thermistor over time;
    measuring a physical property value of the thermistor at least at a first time and a second time during a time period in which the load is being applied to the thermistor,
        first data indicating the physical property value of the thermistor measured at the first time, and
        second data indicating the physical property value of the thermistor measured at the second time; and
    detecting the failure of the thermistor by:
        determining an amount of change in the physical property per unit time based on a difference between the first data and the second data, and a difference between the first time and the second time;
        determining a moving average value of the amount of change in the physical property per unit time; and
        comparing the moving average value of the amount of change in the physical property per unit time with a reference value.

2. The detection method according to claim 1, wherein applying the load to the thermistor includes changing a temperature of the thermistor.

3. The detection method according to claim 1, wherein the physical property value is an electric resistance value of the thermistor.

4. The detection method according to claim 3, wherein the amount of change in the physical property per unit time is an amount of decrease in the electric resistance value per unit time, when the temperature of the thermistor is decreased in applying the load.

5. The detection method according to claim 3, wherein the amount of change in the physical property per unit time is an amount of increase in the electric resistance value per unit time, when the temperature of the thermistor is increased in applying the load.

6. A detection apparatus that detects a failure of a thermistor, the detection apparatus comprising:
    a measurement unit that measures a physical property value of the thermistor at least at a first time and a second time during a time period in which a load is being applied to the thermistor,
        first data indicating the physical property value of the thermistor measured at the first time, and
        second data indicating the physical property value of the thermistor measured at the second time; and
    a detection unit that detects the failure of the thermistor by:
        determining an amount of change in the physical property per unit time based on a difference between the first data and the second data, and a difference between the first time and the second time;
        determining a moving average value of the amount of change in the physical property per unit time; and
        comparing the moving average value of the amount of change in the physical property per unit time with a reference value.

7. A detection system that detects a failure of a thermistor, the detection system comprising:
a load unit that applies a load to the thermistor over time;
a measurement unit that measures a physical property value of the thermistor at least at a first time and a second time during a time period in which the load is being applied to the thermistor,
first data indicating the physical property value of the thermistor measured at the first time, and
second data indicating the physical property value of the thermistor measured at the second time; and
a detection unit that detects the failure of the thermistor by:
determining an amount of change in the physical property per unit time based on a difference between the first data and the second data, and a difference between the first time and the second time;
determining a moving average value of the amount of change in the physical property per unit time; and
comparing the moving average value of the amount of change in the physical property per unit time with a reference value.

8. The detection apparatus according to claim 6, further including:
a load unit that applies the load to the thermistor over time, the load unit being connected to a portion of the detection apparatus.

9. The detection apparatus according to claim 6, wherein applying the load to the thermistor includes changing a temperature of the thermistor.

10. The detection apparatus according to claim 6, wherein the physical property value is an electric resistance value of the thermistor.

11. The detection apparatus according to claim 10, wherein
the amount of change in the physical property per unit time is an amount of decrease in the electric resistance value per unit time, when the temperature of the thermistor is decreased in applying the load.

12. The detection apparatus according to claim 10, wherein
the amount of change in the physical property per unit time is an amount of increase in the electric resistance value per unit time, with a reference value, when the temperature of the thermistor is increased in applying the load.

13. The detection apparatus according to claim 6, wherein the thermistor is a negative temperature coefficient (NTC) thermistor.

14. The detection apparatus according to claim 6, wherein the thermistor is a positive temperature coefficient (NTC) thermistor.

15. The detection system according to claim 7, wherein applying the load to the thermistor includes changing a temperature of the thermistor.

16. The detection system according to claim 7, wherein the physical property value is an electric resistance value of the thermistor.

17. The detection system according to claim 16, wherein
the amount of change in the physical property per unit time is an amount of decrease in the electric resistance value per unit time, when the temperature of the thermistor is decreased in applying the load.

18. The detection system according to claim 16, wherein
the amount of change in the physical property per unit time is an amount of increase in the electric resistance value per unit time, with a reference value, when the temperature of the thermistor is increased in applying the load.

19. The detection system according to claim 7, wherein the thermistor is a negative temperature coefficient (NTC) thermistor.

20. The detection system according to claim 7, wherein the thermistor is a positive temperature coefficient (NTC) thermistor.

* * * * *